(12) United States Patent
Strachan et al.

(10) Patent No.: US 8,493,138 B2
(45) Date of Patent: Jul. 23, 2013

(54) MEMCAPACITIVE DEVICES

(75) Inventors: John Paul Strachan, Milibrae, CA (US); Gilberto Ribeiro, Menlo Park, CA (US); Dmitri Strukov, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 773 days.

(21) Appl. No.: 12/548,124

(22) Filed: Aug. 26, 2009

(65) Prior Publication Data
US 2011/0051310 A1  Mar. 3, 2011

(51) Int. Cl.
  *G11C 11/00* (2006.01)
(52) U.S. Cl.
  USPC ............................ 327/554; 257/532; 365/129
(58) Field of Classification Search
  USPC .... 327/551–559, 336–337; 257/532; 365/129
  See application file for complete search history.

(56) References Cited

U.S. PATENT DOCUMENTS

| | | | | |
|---|---|---|---|---|
| 5,159,564 | A  * | 10/1992 | Swartzel et al. | 702/136 |
| 5,644,349 | A  * | 7/1997  | Martin | 347/46 |
| 6,242,989 | B1 * | 6/2001  | Barber et al. | 331/177 V |
| 7,489,004 | B2 * | 2/2009  | Combi et al. | 257/312 |
| 7,978,395 | B2 * | 7/2011  | Felnhofer et al. | 359/290 |
| 2004/0165323 | A1 * | 8/2004  | Nakamura et al. | 361/15 |
| 2006/0291135 | A1 * | 12/2006 | Musalem et al. | 361/283.4 |
| 2012/0039114 | A1 * | 2/2012  | Bratkovski et al. | 365/149 |

* cited by examiner

*Primary Examiner* — Dinh T. Le (57) ABSTRACT

A memcapacitive device includes a first electrode having a first end and a second end and a second electrode. The device has a memcapacitive matrix interposed between the first electrode and the second electrode. The memcapacitive matrix has a non-linear capacitance with respect to a voltage across the first electrode and the second electrode. The memcapacitive matrix is configured to alter a signal applied on the first end by at least one of a) changing at least one of a rise-time and a fall-time of the signal and b) delaying the transmission of the signal based on the application of a programming voltage across the first electrode and the second electrode.

15 Claims, 7 Drawing Sheets

MEMCAPACITIVE DEVICES

CROSS REFERENCE TO RELATED APPLICATIONS

This application is related to commonly assigned International Application Serial No. PCT-/US2009/047791, filed Jun. 18, 2009, entitled "MEMCAPACITOR," and is related to commonly assigned International Application Serial No. PCT/US2009/047164, filed Jun. 12, 2009, entitled "CAPACITIVE CROSSBAR ARRAYS," both of which are hereby incorporated by reference in their entirety.

BACKGROUND

A memristor is a two-terminal device which has a resistance that is dependent upon the time integral of the magnitude and polarity of the voltage applied to it. One implementation of a memristor is a programmable resistor which utilizes the motion of dopants within a matrix to change the value of its resistance and hold that value until it is changed again. Thus this type of memristor retains a memory of experienced electrical conditions in the matrix.

A memcapacitor is a two-terminal device which has a capacitance that is dependent upon the time integral of the magnitude and polarity of the voltage applied to it. A memcapacitor can be designed to be a linear or nonlinear capacitor depending on the choice of and layout of materials used, and its programming.

While these new devices are revolutionary in being new forms of fundamental circuit elements, many challenges remain as circuits get smaller and quantum effects began to dominate the performance of integrated circuits. It would be desirable to further create electrical devices which could incorporate the characteristics of the new devices in a cost effective and flexible manner.

BRIEF DESCRIPTION OF THE DRAWINGS

The invention is better understood with reference to the following drawings. It should be noted that the drawings are not true to scale. Emphasis has been placed upon clearly illustrating the invention. Various parts of the active elements have not been drawn to scale. Certain dimensions have been exaggerated in relation to other dimensions in order to provide a clearer illustration and understanding of the present invention. Furthermore, like reference numerals designate corresponding similar parts through the several views.

DETAILED DESCRIPTION

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an embodiment," "an example" or similar language means that a particular feature, structure, or characteristic described in connection with the embodiment or example is included in at least that one embodiment, but not necessarily in other embodiments. The various instances of the phrase "in one embodiment" or similar phrases in various places in the specification are not necessarily all referring to the same embodiment.

Although the embodiments illustrated herein are shown in two-dimensional views with various regions having length and width, it should be clearly understood that these regions are illustrations of only a portion of a device that is actually a three-dimensional structure. Accordingly, these regions will have three dimensions, including length, width, and depth, when fabricated on an actual device. Moreover, while the present invention is illustrated by embodiments directed to active devices, it is not intended that these illustration be a limitation on the scope or applicability of the present invention. It is not intended that the devices of the present invention be limited to the physical structures illustrated. These structures are included to demonstrate the utility and application of the present invention to disclosed embodiments.

The inventors have taken the concepts of the memristor and memcapacitor two-terminal devices and extended them to three- and four-terminal devices to create homogenous structure devices that can be used to either delay or alter the shape of an electrical signal or both. In addition, these devices can be programmed separately or by the actual signal itself to perform the various outcomes desired. Depending on the choice of materials used and the magnitude and frequency of the signal propagated, the memcapacitive matrix can be incorporated into the transmission line to give a voltage-dependent propagation delay that also provides for sharp, fast rise times that are desirable for many applications and can also be used for programmable pulse compression and delays. In fact, in one embodiment, the pulse shape or delay can be dependent upon the history of the number and duration of previous pulses.

Figure 1:
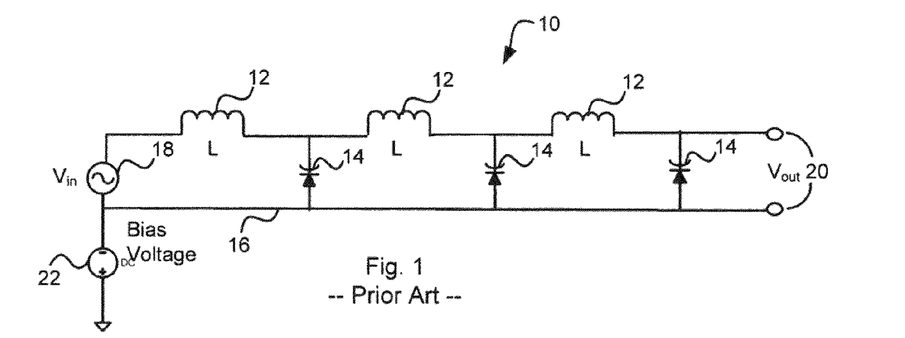
FIG. 1 is a prior art schematic of a conventional programmable delay transmission line using varactors (varicaps).

Typically delays of signals have been performed by transmission lines such as wires, coaxial cables, dielectric slabs, striplines, optical fibers, or waveguides just to name a few. These delay lines have generally only been available to have fixed delays dependent upon the materials, lengths, geometric construction and frequencies of the signals used. As shown in FIG. 1, conventional programmable delay lines 10 have generally incorporated the use of variable capacitors such a varactors 14 (also known as varicaps) or mechanically adjusted plates (not shown). An input voltage 18 ($V_{in}$) is applied to the transmission line 10 to create a modified output voltage 20 ($V_{out}$). The input voltage 18 and output voltage 20 are connected via a common signal 16 which is biased by voltage bias 22 ($V_b$). This voltage bias 22 allows the varactors 14 to be operated in a reversed-biased manner to provide a variable capacitance.

In this reversed-bias state, varactors 14 are reversed-biased PN junctions which change junction capacitance based on the depletion region created under the reverse bias between the P and N regions. Changing the voltage bias 22 on the PN junction varies a width of the depletion region and thus the value of the capacitance between the PN junction of the two terminal device. Because the voltage to capacitance relationship of varactors is typically non-linear, these varactor devices have also been used to create pulse-shaping non-linear transmission lines by placing several varactors 14 at discrete locations between inductors 12 along a transmission line 10. However, the use of varactors 14 limits the application and use of these transmission lines 10 due to the need for current to bias the varactors and the need to limit the voltage presented on input voltage $V_{in}$ 18 to prevent the varactor 14 from entering a forward biased state.

The claimed subject matter is superior to prior varactor or other approaches. A non-linear memcapacitive matrix of material is disposed continuously between two electrodes of a transmission line to create the signal modifying effect across the entire transmission line. Further, a memcapacitive transmission line (MTL) device does not require biasing current and thus uses less power than a varactor-based transmission line. Also, the MTL device is capable of operating at both voltage polarities without a DC offset bias. By incorporating the memcapacitive matrix within the transmission line itself, the MTL device elegantly provides a continuous memcapacitance per length that provides a superior pulse-shaping performance such as by reducing unwanted parasitic reflections.

Throughout the specification, a capacitive device which contains mobile dopants in a semiconducting matrix (a "memcapacitor") is used as an illustrative example of an alternative nonlinear solid state capacitor also known as a nanoionic device. Memcapacitors are non-linear capacitive components which are able to alter and retain the value of their capacitance based on a history of electrical conditions such as the amount of voltage and the time that such conditions have occurred.

Due to the new nature of memristive and memcapacitive devices, before going into the design of an MTL device, some review of the memristor and memcapacitor is provided. More detailed information can be found in the commonly assigned patent applications noted in the Cross-Reference section at the start of the specification.

Description of Memcapacitor

A memcapacitive device may be similar to a programmable capacitor or "memcapacitor." The term "memcapacitor" is derived from the combination of the two terms "memory" and "capacitor." A capacitor is a fundamental circuit element comprised of two electric conductors with a dielectric material in between. Capacitance is a measurement of the ability of the capacitor to hold electrical charge. Capacitance is related to the overlapping area of the two conductors, the distance between the conductors and the permittivity of the dielectric medium which separates the conductors. For a parallel plate capacitor, the capacitance is given by:

$$C = \varepsilon_r \varepsilon_o \frac{A}{d}$$

Where:
C=the capacitance in farads
A=the area of overlap between the two plates in square meters
$\varepsilon_r$=the relative dielectric constant of the insulator between plates
$\varepsilon_0$=the permittivity of free space
d=the separation between the plates in meters.

Through memcapacitive principles, a nanoionic capacitive device may have its capacitance altered based on a history of electrical conditions. The magnitude of the capacitance exhibited by the device may then be indicative of past electrical conditions. Such electrical conditions which may change the locations of dopants within the memcapacitor include, but are not limited to, electrical fields, resistance induced heating, electrical current, and their combinations.

Throughout the specification and appended claims, the term "memcapacitor" or "memcapacitive" is used in several embodiments to describe a combination of an insulating/semiconductor matrix which exhibits non-linear capacitance in the presence of a programming electrical field and the desired long, medium, or short term dopant stability within the matrix when the programming field is removed. While memcapacitor or memcapacitive devices of the claimed subject matter is intended to encompass other materials exhibiting non-linear capacitance, the memcapacitive effect is most strongly evident in nanometer scale devices that include a dopant that exhibits dopant motion and that allows the device to "remember" past electrical conditions. Accordingly, without intent to limit the claim scope and to simplify discussion and ease understanding, these particular nanoionic devices will be primarily described within this specification as possible embodiments. The various principles described herein can be used by those of skill in the art to use other materials to provide non-linear and time dependent capacitive behavior and thus their use would fall within the scope and spirit of the claimed invention.

The presence of dopants within an insulating or semiconducting matrix can dramatically alter the electrical characteristics of the device. For example, dopants can be introduced into a matrix or moved within a matrix to dynamically alter the electrical capacitance of the device. In some circumstances, the motion of dopants can be induced by the application of a programming electrical field or voltage pulse across a suitable matrix. After removal of the electrical field or voltage pulse, the location and characteristics of the dopants remain stable until the application of another programming electrical field or voltage pulse.

For example, when an electrical field of sufficient magnitude is applied to a memcapacitor, the dopants within the matrix material are displaced. When the electrical field is removed from the circuit, the displacement state of the dopants allows the memcapacitor to "remember" how much voltage was previously applied and for how long. The motion of these dopants may alter the capacitance of the memcapacitor in a variety of ways. For example, the dopant motion may increase or decrease the effective distance between charged surfaces. Additionally or alternatively, the dopant motion may increase or decrease the surface area over which the charge acts or the permittivity of the insulating material separating the charged plates. The dopants remain in this displaced state over long periods of time, thereby retaining a memory of the past electrical fields applied to the device. Until another electrical field is applied to the memcapacitor which has sufficient intensity or duration to induce dopant motion, the capacitance characteristics of the memcapacitor are substantially stable.

Throughout the specification, the term "memcapacitive matrix" or "semiconductive matrix" describes a weakly ionic conductive material in some embodiments which is capable of transporting and hosting ions that act as dopants to control the flow of electrons through the memcapacitor. The definition of a weakly ionic conductive material is based on the application for which the memcapacitive device is designed. In general, it is desired for the memcapacitive device to stay in a particular state, either lower or higher capacitance, for an amount of time that may range from a fraction of a second to years, depending on the application. Thus, the diffusion constant of the ions for such a device is, in one embodiment, low enough to ensure the desired level of stability. At the same time the mobility of the ions can be greatly enhanced (with respect to the mobility given by Einstein-Nersnt relation) by increasing internal temperature, e.g. due to Joule heating, or applying very high electric fields during programming operations. This desired level of stability avoids inadvertently turning the device from a lower capacitance to a higher capacitance state or vice versa via ionized species diffusion. Yet, such flexibility to control the diffusion allows the intentionally setting of the state of the memcapacitive device with a voltage pulse.

Accordingly, a "weakly ionic conductor" is one in which the ion mobility, and thus the diffusion constant, is small enough to ensure the stability of the state of the device for as long as necessary under the desired conditions (e.g., the device does not change state because of diffusion of the dopants). In contrast, "strongly ionic conductors" would have large ionized species mobilities and thus would not be stable against diffusion.

Figure 2:
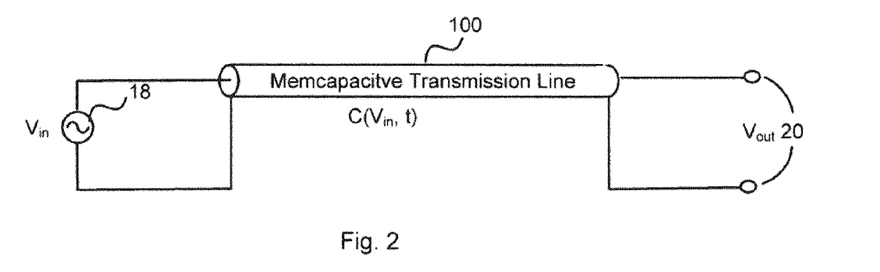
FIG. 2 is an illustration of one embodiment of the invention used as a memcapacitive based transmission line device.

FIG. 2 is an illustration of one embodiment of the invention used as a memcapacitive based transmission line device. Memcapacitive device 100 is shown here as a four terminal device with a voltage source 18 providing an applied voltage $V_{in}$ to a first end. The memcapacitive device 100 has an intrinsic inductance $L_i$ based on the shape and layout of electrodes of the device. Between the electrodes a memcapacitive matrix can be used to alter the distributed capacitance of the device such that the capacitance is voltage dependent in a linear and non-linear fashion as well as having the capability to be a function of past electrical conditions like a memcapacitor. Accordingly, the memcapacitive device has a transmission delay of $\sqrt{L_i C(V_{in})} t$ at the second end output $V_{out}$ 20. Memcapacitive device 100 can also be operated as a three terminal device by restricting one electrode to a fixed voltage reference, such as ground (see FIG. 5).

For a nanoionic embodiment, a number of matrix/dopant combinations may be used, depending on the manufacturing process and the application. For example, silicon may be used as a memcapacitive matrix and lithium ions may be used as the mobile dopant species. Alternatively, titanium dioxide may be used as the memcapacitive matrix and oxygen vacancies may be used as the mobile dopant species.

Figure 3A:
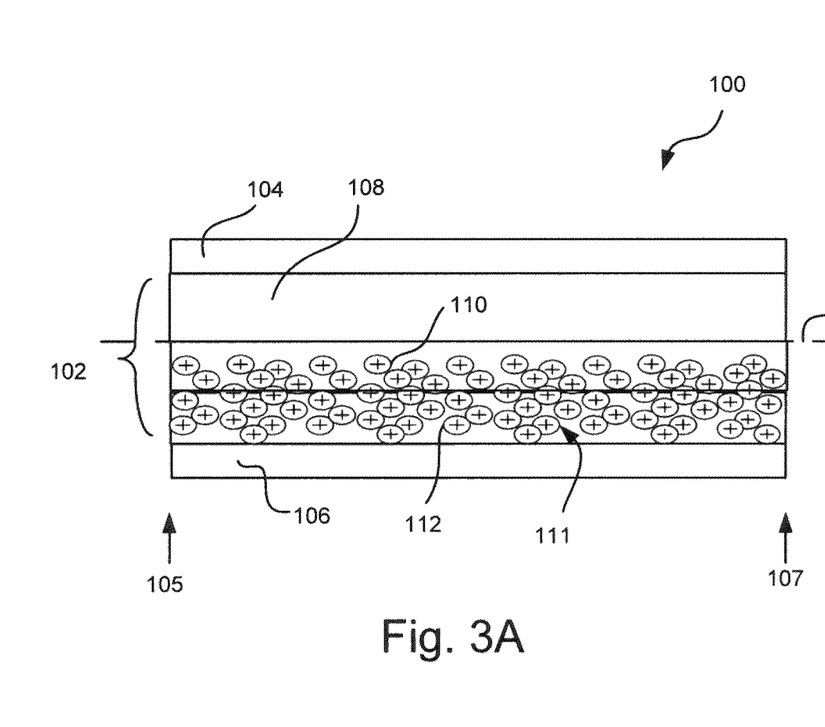
FIGS. 3A and 3B are illustrations of one embodiment of the invention showing the operation of a memcapacitive material in a memcapacitive device.
Figure 3B:
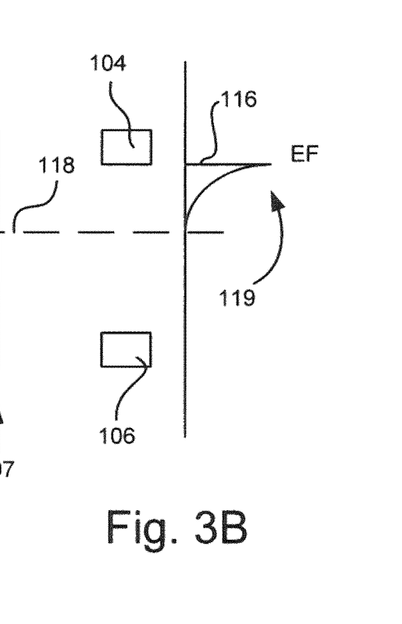

Using these memcapacitive principles, the internal operation of one embodiment of a memcapacitive device 100 such as a memcapacitive transmission line (MTL) device is described in FIGS. 3A and 3B. In order to set a specific memcapacitive capacitance, a certain thermal and/or electrical condition may be applied to the memcapacitive junction. Throughout this specification and appended claims, electrical conditions applied to a memcapacitive junction to change its state will be referred to as "programming conditions." In one embodiment, the programming condition could be a voltage pulse. In other embodiments, it may include the application of heat or other energy sources such as photons, phonons, etc.

FIG. 3A shows an illustrative four-terminal memcapacitor device 100. According to one embodiment, the four-terminal memcapacitor device 100 includes a first electrode 104 and a second electrode 106, both of which are in electrical and possible physical contact with a memcapacitive matrix 102. Each of the first electrode 104 and the second electrode 106 has a first end 105 and a second end 107. The first electrode 104 and the second electrode 106 each have a predetermined shape and layout to create an intrinsic inductor $L_{in}$. Those of skill in the art are aware of several methods to determine or estimate inductance of flat traces on various substrates. In the configuration illustrated in FIG. 3A, the memcapacitive matrix 102 is made up of a lightly doped semiconductor region 112 and an acceptor layer 110 which contains a number of mobile ions 111.

FIG. 3B is an illustration of the electrical potential 119 through the memcapacitive device 100. At the interface between the undoped portions 108 of the matrix 102 and the electrode 104 there is a large difference in the electrical conductivity and other properties across the interface. This creates an interface which exhibits behavior similar to a Schottky barrier. A Schottky barrier is a potential barrier which forms at a metal-semiconductor interface and has diode-like rectifying characteristics. Schottky interfaces are different than a P-N interface in that it has a much smaller depletion width in the metal. In multilayer thin films, the interface behavior may not be exactly the same as a traditional Schottky barrier. Consequently, various interfaces between the illustrative thin films are described as "Schottky-like." At moderate voltages, a Schottky-like barrier 116 allows electrical current to flow in only one direction. The characteristics of the Schottky-like barrier 116 are dependent on a number of factors, including the metal's work function, the band gap of the intrinsic semiconductor which makes up the memcapacitive matrix, the type and concentration of dopants in the semiconductor, and other factors.

FIG. 3B's graph shows the electrical potential 119 through the matrix 102. A Schottky-like barrier 116 exists at the interface of electrode 104 and semiconducting region 108. Because the mobile dopants 111 are concentrated in the bottom of the memcapacitive matrix 102 in FIG. 3B, the potential barrier is high and wide at the interface between the top electrode 104 and the memcapacitive matrix 102. As discussed above, this produces a relatively low capacitance junction because the conducting surface of the mobile dopants (shown by a dotted line 118 which extends across the memcapacitive matrix 102) is relatively far away from the top electrode 104. As shown above, the larger the distance between conducting surfaces (all other factors remaining constant) the lower the capacitance will be.

As the mobile dopants 111 are distributed through the matrix 102 by a programming voltage or condition, the capacitance increases such that the mobile dopants 111 are much closer to the top electrode 104. This brings the conducting surfaces of the memcapacitive device 100 much closer together. This action will change the Schottky-like barrier 116 such that it is much narrower and possibly lower at the interface.

As discussed above, once the mobile dopants have been distributed by the application of a programming condition, they remain stable for a desired duration and through one or more electrical pulses applied to the memcapacitive transmission line. According to one exemplary embodiment, the programming conditions may include a voltage which exceeds the breakdown voltage of the Schottky-like barrier 116. The barrier then becomes conductive and allows direct current to flow through the matrix.

This heats the matrix 102 and increases the mobility of the dopants 111. This breakdown process is non-destructive and reversible, so long as the amount of current flowing does not reach levels that cause the semiconductor material to overheat and cause thermal damage.

The dopants then move under the influence of an applied electrical field to the desired location. The programming condition is removed and the matrix cools. The mobile dopants then remain in substantially the same position. Such programming allows the memcapacitive matrix 102 to have variable capacitance states that have different voltage dependent linear and non-linear performance.

Figure 4A:
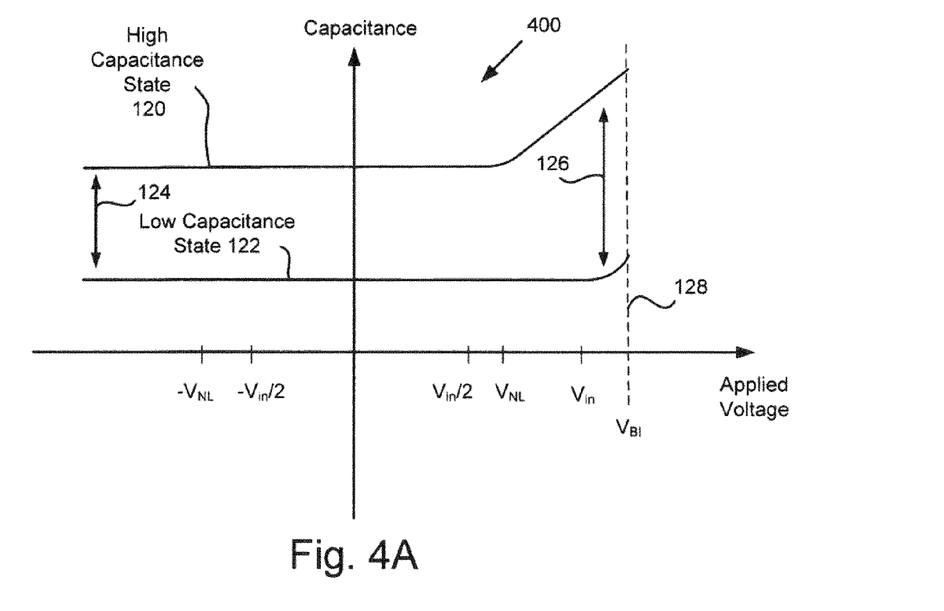
FIG. 4A is an exemplary graph showing capacitance vs. voltage for one embodiment which illustrates the non-linear capacitance with respect to voltage.

According to one exemplary embodiment as shown in FIG. 4A, the memcapacitive junctions exhibit significant nonlinear capacitance in a higher capacitance state 120 than in a lower capacitance state 122. This nonlinear capacitance is generated by the interaction of the Schottky-like barrier 116 with the applied voltage. The Schottky-like barrier 116 creates a depletion region. The depletion region is empty of conducting electrons and holes, but may contain a number of mobile dopants. The depletion region with its dopants inside behaves like a capacitor. By varying the voltage applied to the interface it is possible to vary the depletion width, the charges within, and consequently the capacitance of the interface.

The nonlinear capacitance across the Schottky-like barrier 116 is nonlinear and is given below:

$$C(N_D, v) = \sqrt{\frac{\varepsilon_r \varepsilon_0 N_D}{q(V_{BI} - v)}}$$

Where:
C=capacitance measured in farads,
$\varepsilon_r$=relative permittivity of the insulator between the charged plates,
$\varepsilon_0$=permittivity of free space,
$N_D$=the number of dopants,
q=charge, which is a function of applied voltage,
$V_{B1}$=built in voltage of the Schottky barrier, and
v=applied voltage.

In general, the capacitance of the memcapacitive device 100 is related to the slope (the derivative) of a charge/voltage relationship (not shown) for the Schottky-like barrier 116. In the graph 400 of FIG. 4A, the horizontal axis represents voltage applied to the input of the memcapacitive device 100 while the vertical axis represents the capacitance of the device. The top trace illustrates a higher capacitance state 120 as a function of applied voltage input 18. It can be seen that for most voltage values, the higher capacitance 120 is relatively constant. The bottom trace illustrates a lower capacitance state 122 with respect to applied voltage.

The low capacitance state 122 shows little non-linearity and less sensitivity to changes in applied voltage. The higher capacitance state 120 shows significant nonlinearity in capacitance due to the number of charges present in the depletion region at a particular applied voltage. Only as the applied voltage $V_{in}$ approaches $V_{NL}$ (nonlinear voltage) does the capacitance get higher in value due to nonlinearity effects of the depletion region. For example, a relatively small charge is present when a voltage of $V_{in}/2$ is applied to the interface, but a much greater charge is present when a voltage of $V_{in}$ is applied that is greater than $V_{NL}$. Thus the capacitance seen by a voltage source 18 at $V_{in}/2$ is less that the capacitance seen at $V_{in}$ when $V_{in}$ is greater than $V_{NL}$.

The vertical dashed line labeled $V_{B1}$ (or built-in voltage) represents the breakdown voltage 128 of the memcapacitive junction Schottky-like barrier. According to one exemplary embodiment, the breakdown voltage 128 may be approximately three volts but such value depends on the materials, layout, and thickness of materials used. When the applied voltage exceeds the breakdown voltage 128, the memcapacitive junction becomes conductive and direct electrical current passes through the junction. As discussed above, this can result in resistive heating of the matrix and a corresponding increase in the mobility of the mobile dopants. Consequently, the applied signal voltage across any given junction of memcapacitive device 100 does not typically exceed the breakdown voltage unless one wishes to program the memcapacitive device state. The nonlinear effect of the Schottky-like barrier can be used to shape or delay signals in conjunction with the intrinsic inductance $L_i$.

However, in some embodiments it can be desirable during the programming conditions that the breakdown voltage is exceeded. This infusion of direct current can significantly reduce the alteration time of the memcapacitive device 100 because of the significant increase in dopant mobility.

As can be seen from FIG. 4A, the capacitance of the junction in the higher capacitance state 120 is relatively small at $V_{in}/2$ compared with the capacitance at $V_{in}$ due to the nonlinearity of the capacitance/voltage behavior of the memcapacitor. This nonlinearity allows the input signal to be modified upon transmission across the memcapacitive device 100 at the $V_{out}$ 20.

Figure 4B:
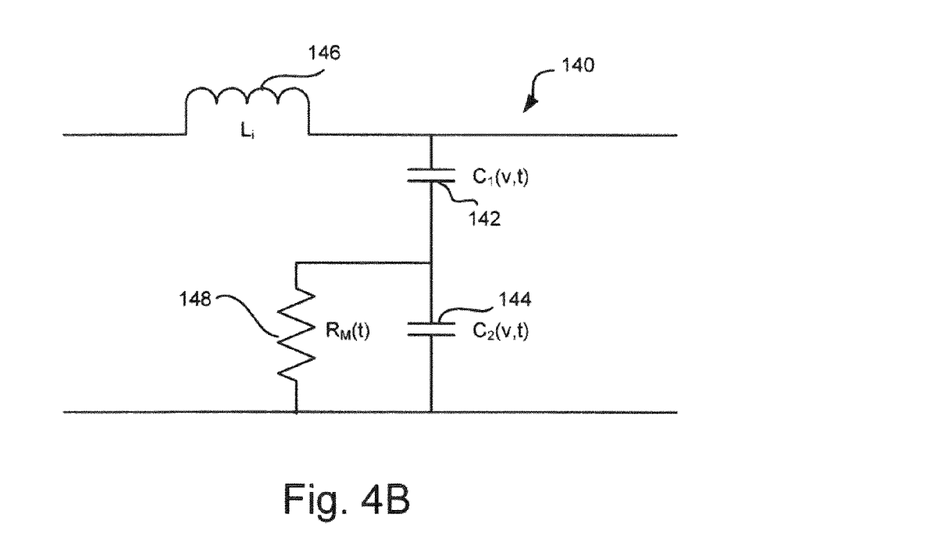
FIG. 4B is an exemplary schematic of one embodiment of a memcapacitive transmission line device such as that shown in FIG. 4A.

FIG. 4B is a circuit schematic representation 140 of the memcapacitor device 100 of FIG. 3A. Capacitor C1 142 represents the capacitance as shown by created by the top or first electrode 104 and the mobile ions 111 serving as conducting surfaces with the lightly doped semiconductor region 108 serving as the dielectric material in between the two conducting surfaces. Capacitor $C_2$ 144 represents the capacitance created by the mobile ions 111 and the bottom or second electrode 106 serving as conducting surfaces with the lightly doped memcapacitive matrix region 112 serving as the dielectric between the two surfaces. Capacitor C1 142 and capacitor $C_2$ 144 are in series. The total capacitance of capacitors in series is given below:

$$C_{total} = \frac{C_1 * C_2}{(C_1 + C_2)}$$

Where:
$C_{total}$=the total capacitance of the device in farads
$C_1$=the capacitance of the first capacitor
$C_2$=the capacitance of the second capacitor which is in series with the first capacitor.

As can be seen from the above equation, the arrangement of capacitors $C_1$ and $C_2$ in series always results in a total capacitance that is less than $C_1$. Note that $C_2$ may be also partially resistive as shown by a parallel resistor $R_M$ 148 to $C_2$ that may be accounted for or ignored depending on the particular memristance value determined by geometry, material choice, etc.

Figure 5:
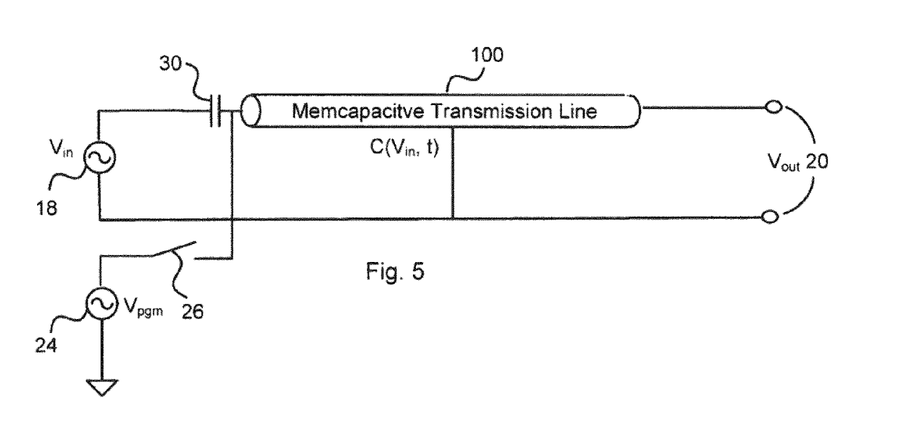
FIG. 5 is an exemplary schematic of one embodiment of a memcapacitive transmission line device that includes an additional programming voltage source.

Because $C_2$ 144 is based on the memcapacitive matrix 102, it is dependent upon the history of electrical or other energy parameters that have been presented to it and thus is a function of time. $C_1$'s "d" is also based on the memcapacitive matrix 102 and thus is also dependent on time and the past history of electrical parameters. The electrical parameters may be that of an applied input signal 18 (FIG. 1) and alternatively may be the applied input signal 18 and a second applied voltage such as a programming voltage 24 (FIG. 5). Because the shape and layout of the memcapacitive device will have an intrinsic inductance $L_i$ 146, the memcapacitive device 100 modeled by schematic 140 will have a time dependent transmissive delay which can be represented by the equation:

$$\tau_d(t) = \sqrt{L(C_{\text{total}}(t))}$$

Where:
$C_{\text{total}}(t)$=an adjustable capacitance based on a history of electrical conditions as represented by capacitive states 120, 122 in FIG. 4A and elements $C_1$, $C_2$, and $R_M$ in FIG. 4B.

FIG. 4B is a circuit schematic representation 140 of the memcapacitive device 100 in the higher capacitive state 120 illustrated in FIG. 3A. Capacitor $C_1$ 142 represents the capacitance created by the top electrode 104 and the mobile ions 111 which serve as conducting surfaces. The lightly doped region 108 serves as the dielectric material between the two conducting surfaces. The resistor $R_M$ 148 represents a small resistance of the memristive matrix region 102 between the acceptor layer 110 and the bottom electrode 106 which overwhelms $C_2$ 144.

As a result of the elimination of capacitor $C_2$ 144 the total capacitance of the device 100 has significantly increased. The total capacitance of the entire device is now made up primarily from capacitor $C_1$ 142. For example, if the values of the capacitance of capacitor $C_1$ 142 and capacitor $C_2$ 144 are arbitrarily designated as having a numeric value of 2 picofarads, the total capacitance can be determined through the application of the equation for $C_{\text{total}}(t)$ above. By substituting the value of 2 picofarads for the $C_1$ 142 and $C_2$ 144 variables into the equation, it can be shown that the total capacitance of the memcapacitive device 100 is 1 picofarad. However, when capacitor $C_2$ 144 is eliminated, the capacitance of the memcapacitive device 100 is equal to the capacitance of the remaining capacitor $C_1$ 142, which equals 2 picofarads.

To create a higher capacitive state a voltage pulse greater than $V_{B1}$ is applied, such that a portion of the mobile ions 111 are redistributed toward the bottom electrode 106. These mobile ions 111 increase the doping levels of the bottom matrix section 112 and substantially increase its electrical conductivity.

The application of a programming voltage with an opposite polarity can return the memcapacitive device 100 to its low capacitance state. In this exemplary embodiment in FIG. 3A, a positive voltage pulse greater than $V_{B1}$ is applied to the bottom electrode 106. This positive voltage repels the mobile dopants 111 and moves them back into the acceptor layer 110. This returns the bottom matrix section 112 to its intrinsic and insulating state. This reestablishes the capacitance $C_2$ 144 and increase $R_M$ 148 resistance such that there is little leakage through it and this effect reduces the overall capacitance of the memcapacitive device 100 due to the series combination of $C_1$ and $C_2$.

Capacitor $C_1$ 142 represents the capacitance created by the top electrode 104 and the mobile ions 111 serving as conducting surfaces with the lightly doped region 108 serving as the dielectric material in between the two conducting surfaces. Capacitor $C_2$ 144 represents the capacitance created by the mobile ions 111 and the bottom electrode 106 serving as conducting surfaces with the acceptor layer 110 void of mobile ions 111 and acting as a dielectric between the two surfaces.

Though only two capacitive states are shown in FIG. 4A, the memcapacitive device 100 may be configured in a number of other states. Based on the polarity, strength, and duration of applied programming voltages, various distributions of mobile dopants can be achieved.

FIG. 5 is an exemplary schematic of a programmable transmission line in one embodiment of a memcapacitive device 100 that includes an additional programming voltage source $V_{pgm}$ 24. In this embodiment, $V_{in}$ 18 is applied to memcapacitive device 100 via a coupling capacitor 30 to block any DC voltage from being applied to the memcapacitive device 100 such that $V_{in}/2$ to $-V_{in}/2$ is applied to the device 100. If one does not wish or cannot modify the input voltage $V_{in}$ 18 to program the capacitive states, a second or additional voltage source such as $V_{pgm}$ 24 can be included to reset or alter the capacitance of the memcapacitive device 100, thereby allowing the $V_{in}$ 18 signal to be operated as originally intended. $V_{pgm}$ 24 is coupled to the memcapacitive device 100 via a switch 26 (electrical, mechanical, or otherwise) in one embodiment. Other methods of coupling $V_{pgm}$ 24 can be substituted and still fall within the claimed subject matter.

FIGS. 6A-7B illustrate some of the ways in which memcapacitive device 100 may be modified and operated to alter an input signal as it is being transmitted through it. The horizontal axes in FIGS. 6A-7B are time and the vertical axes are voltage. One embodiment (FIGS. 6A and 6B) allows the input signal to vary within the non-linear range of the memcapacitive device 100 to allow the input signal itself to determine the modification desired. One such application is in pulse shaping or variable delay of the input signal. Another embodiment (FIGS. 6A and 6C) is to operate the input signal within the linear portion of the memcapacitive device 100 such that there is no long term change to the capacitance state of the memcapacitive device. However, in this embodiment, the memcapacitive device capacitance state can be programmed originally by the input voltage by taking it into the programming range for a desired period of time or using a second voltage source such as shown in FIG. 5. In yet another embodiment (FIGS. 7A and 7B), the memcapacitive device can be operated by using an input signal that ventures into the programming range to modify the delay ($\tau_d$) of the memcapacitive device based on the number or length or voltage levels of pulses within the input signal 18.

Figure 6A:
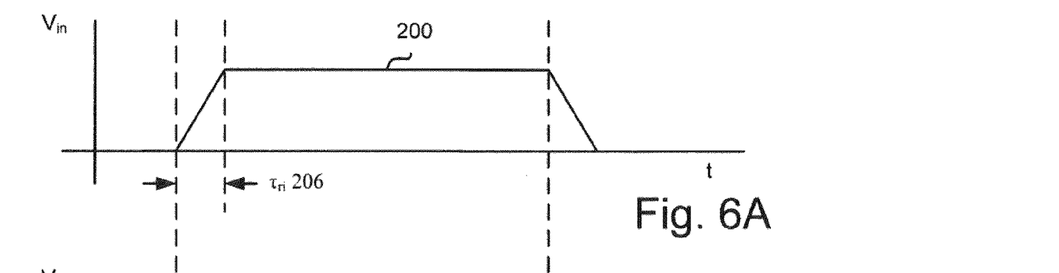
FIG. 6A is an exemplary input signal to a memcapacitive device in one or more embodiments.
Figure 6B:
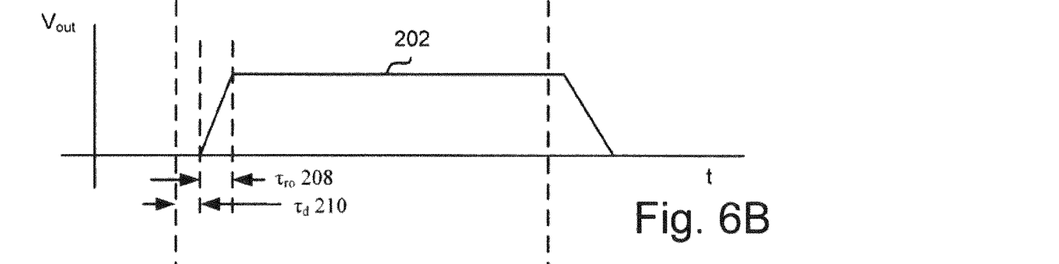
FIG. 6B is an exemplary output signal of a memcapacitive device in one embodiment use to shape the input signal of FIG. 6A.

FIG. 6A is an exemplary input signal to a memcapacitive device in an embodiment of using or operating the memcapacitive device 100 to pulse shape an input signal 18. FIG. 6B is an exemplary output signal 20 of the memcapacitive device 100 used to shape the input signal of FIG. 6A. In this embodiment the memcapacitive matrix material and orientation is chosen to have a programming voltage $V_{pgm}$ larger than the max voltage $V_{in}$ of the input signal 18 (see FIG. 4A). The memcapacitive matrix and voltage sources are configured (reversed from FIG. 4A) such that as the incoming input signal pulse 200 reaches the max voltage, the material has a lower capacitance than when a lower voltage is presented on the device. The higher capacitance results in a longer delay when a lower voltage is on the device. As the input signal approaches the $V_{NL}$ voltage level, the non-linearity of the Schottky-like barrier memcapacitive matrix causes the capacitance to lower thus reducing the delay and thereby causing the output voltage to rise faster. This effect compresses the incoming leading edge of the pulse 200 giving a faster rise time for slow rising signals. Accordingly, output pulse 202 has a rise-time $\tau_{ro}$ 208 shorter than the rise-time $\tau_{ri}$ 206 of the input pulse 200. There will be a minimum transmission delay $\tau_d$ 210 for the entire signal based on $\sqrt{L_i C_{total}(t)}$, where $C_{total}(t)$ is the memcapacitive device capacitance at low voltage and $L_i$ is the intrinsic inductance of the transmission line.

Of course, the memcapacitive matrix and voltage can be configured to cause the trailing edge times to be pulse shaped and the leading rise time to be delayed. Accordingly, the memcapacitive matrix can be configured to allow its capacitance to shape at least one of a leading edge and a trailing edge of a signal present at a first end of the memcapacitive device to a second end of the memcapacitive device 100. This is done by applying a first signal to the first end of the first electrode sufficient to alter the capacitance of the memcapacitive matrix during the transition time of the leading edge or trailing edge by moving the mobile dopants into the depletion region of the Schottky-like barrier between the first electrode and the second electrode. This causes the memcapacitive matrix to be electrically configured between a higher capacitance to a lower capacitance thus altering the transmission rise and fall times of the memcapacitive device based on the voltage level of the incoming signal.

In some embodiments of 6A and 6B, the diffusion constant of the mobile dopants 111 is not as much of a concern as contrarily with other memcapacitive devices that wish to continuously remember the state of the memcapacitive material. In fact, if the time period between programming the capacitive states is short, material that has mobile dopants with a high diffusion constant can be used to help lower the programming voltage thus expanding the range of voltages that this embodiment of the memcapacitive device 100 can operate with. If the programming of the capacitance state of the memcapacitive material is intermittent or occurs infrequently, then using a memcapacitive material where the mobile dopants have a low diffusion constant would be more appropriate.

Figure 6C:
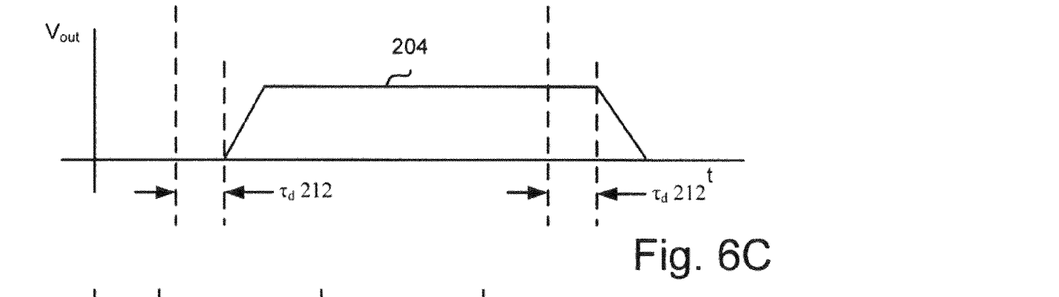
FIG. 6C is an exemplary output signal of a memcapacitive device in another embodiment used to provide a programmable delay of the input signal in FIG. 6A.

FIG. 6C is an exemplary output signal of a memcapacitive device in another embodiment used to provide a programmable delay of the input signal in FIG. 6A. In this embodiment of operating the memcapacitive device, the transmission delay through the device is programmed by applying an appropriate programming voltage to the first electrode and the second electrode. Then a first signal pulse 200 is applied to the memcapacitive device with a voltage level $V_{in}$ that does not venture into the memcapacitive device nonlinear region. However, the capacitance state will affect the overall delay of a signal through the transmission line. The output signal 20 of the memcapacitive device 100 can be sensed at a second end 107 of the device 100 with a delay $\tau_d$ 212 which is determined by the prior programming of the capacitance state.

This method of operation creates a programmable delay line which after programming does not require the continual bias currents of varactor type transmission lines or the need for a continual bias voltage. By using a memcapacitive material that has a slow diffusion constant, this embodiment is useful for adjusting the delays on integrated circuits, printed circuit, or hybrid circuit devices to account for their process variations thus increasing yields and lowering costs.

In one embodiment to program the fabricated memcapacitive device 100, one basic mode of operation is to apply a negative voltage pulse to the electrode 106 closest to the acceptor layer 110 large enough to heat and redistribute the mobile ions 111 into the lightly doped semiconducting regions 112. The mobile ions 111 are specifically chosen from those that act as electrical dopants for the memcapacitive matrix 102, and thereby varying the capacitance state of the device. As discussed above, the memcapacitive matrix 102 and the dopant species are chosen in some embodiments such that the drift of the dopants 111 within the memcapacitive matrix 102 is possible but not too mobile, to ensure that the memcapacitive device 100 will remain in whatever state it is set for a reasonably long time, perhaps many years at room temperature. This ensures that the memcapacitive device 100 is nonvolatile, that is, that it holds its capacitive state after the programming voltage has been removed. The memcapacitive device 100 can then act as a programmed delay line which can be operated continuously or multiple times and yet remain stable over the desired duration of use.

Figure 7A:
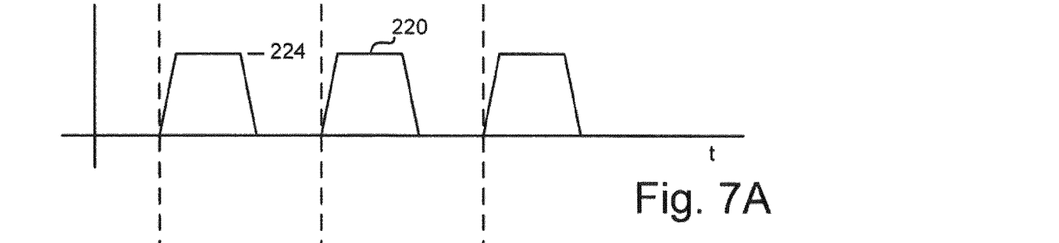
FIG. 7A is another exemplary input signal to a memcapacitive device in one embodiment.
Figure 7B:
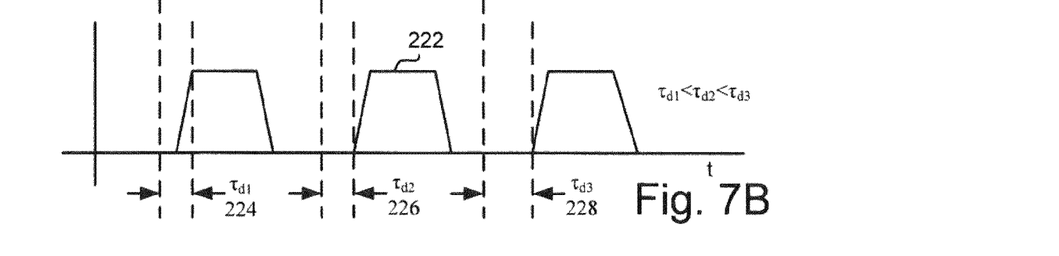
FIG. 7B is an exemplary output signal of a memcapacitive device in another embodiment used to provide a delay based on the history of previous pulses in one embodiment.

FIG. 7A is another exemplary input signal 18 to a memcapacitive device 100 in another embodiment. FIG. 7B is an exemplary output signal of a memcapacitive device in another embodiment used to provide a delay based on the history of previous pulses in one embodiment. Input signal 220 is a sequence of pulses. In this embodiment, the max voltage 224 of a pulse is sufficient (greater than $V_{pgm}$) to cause the memcapacitive matrix to be altered at least partially. In this embodiment, the memcapacitive matrix is configured such that a higher voltage causes the capacitance to increase, thus causing the transmission delay $\tau_d$ to increase. As more pulses are presented or the time of a pulse is lengthened, the programming continues causing additional delays to be incurred due to the increasing capacitance. The output signal pulses 222 are individually delayed based on the amount of voltage and duration of the previous pulses. This results in the transmission delay $\tau_{d1}$ 224 of the first pulse being less than the transmission delay pulse $\tau_{d2}$ 226 of the second pulse which is still less than the transmission delay $\tau_{d3}$ 228 of the third pulse ($\tau_{d1} < \tau_{d2} < \tau_{d3}$). By being able to change the delay based on the number of pulses that have occurred, a simplified pulse counter can be employed using this embodiment. Alternatively, a detector or sensor can be used to detect the amount of delay from the input and output ends of the memcapacitive device to allow for detection that a predetermined delay is present after the input signal has been active for a desired period of voltage or time.

Figure 8:
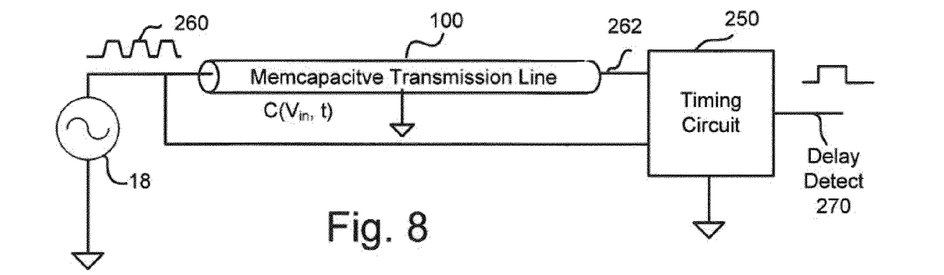
FIG. 8 is an exemplary schematic of one embodiment of a memcapacitive device used to indicate that an input signal has been active for a desired period of time-voltage.

For instance, FIG. 8 is an exemplary schematic of one embodiment of a memcapacitive device used to indicate that an input signal has been active for a desired period of time-voltage. An input source 18 has a signal input 260 having a number of pulses at one or more voltage levels that can program the memcapacitive matrix 108 in memcapacitive device 100. The input source 18 is applied to the first end 105 of memcapacitive device 100. The second end 107 of memcapacitive device 100 is coupled to a timing circuit 250 along with the input source 18. The timing circuit can be one of a number of time detection circuits that are digitally or analogly implemented or combinations thereof implemented. One common analog circuit is a National Semiconductor LM555™ timer. A digital time delay calculation circuit can include a high speed clock and counter with appropriate gating. Accordingly, a timing circuit can be coupled to the first end 105 and second end 107 of the memristive device 100 and configured to detect a predetermined transmission delay ($\tau_d$) between a first signal 260 present at the first end 105 and a second signal 262 present at the second end 107 by outputting a third signal 270.

Figure 9:
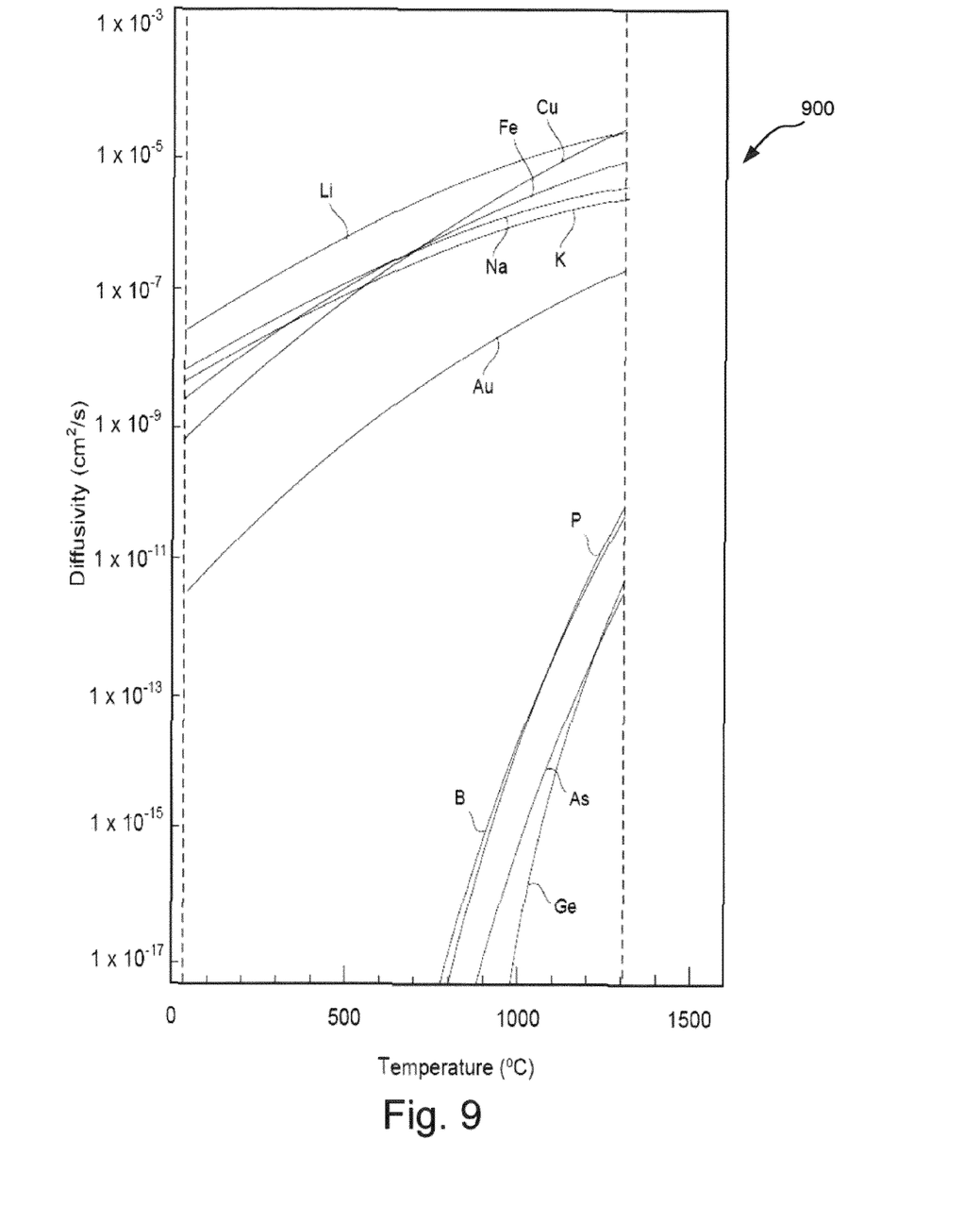
FIG. 9 is an exemplary graph of diffusivity within silicon vs. temperature for several materials which may be used to create a memcapacitive device.

As noted previously, the diffusion constant can be varied to offset the mobility of mobile dopants 111. FIG. 9 is an exemplary graph illustrating various diffusivities of dopants within silicon as a function of temperature. The horizontal axis shows temperature in degrees Celsius and the vertical axis is a logarithmic scale of diffusivity in centimeters squared per second. As can be seen from the graph of FIG. 9, boron (B) has a relatively low diffusivity rate through a silicon matrix. At normal operating temperatures of a memcapacitive device (such as below 700 degrees), the diffusivity of boron is less than $1\times10^{-17}$ centimeters squared per second. In contrast, the mobility of lithium (Li) is significantly higher over the entire temperature range illustrated in the graph. At room temperature lithium has a diffusivity of approximately $1\times10^{-7}$ centimeters squared per second. The diffusivity of lithium increases with temperature. According to one exemplary embodiment, the matrix could be resistively heated to increase the mobility of the lithium during writing or programming the memcapacitive device capacitance state. The memcapacitive device then cools and the mobility of the lithium decreases and remains more stable during the operations which utilize the state of the memcapacitive device. Lithium and boron are only one exemplary example of mobile and acceptor dopants which could be used in a silicon matrix. A few additional species are shown in FIG. 9. A variety of other dopant combinations could be used.

Further, a number of other matrix materials other than Si could be used and various combinations of acceptor dopant species and mobile dopant species could be selected to provide the desired memcapacitive behavior. For example, Table 1 below is a non-exhaustive list of exemplary memcapacitive matrix materials which could be used to make a memcapacitive device 100.

Figure 10:
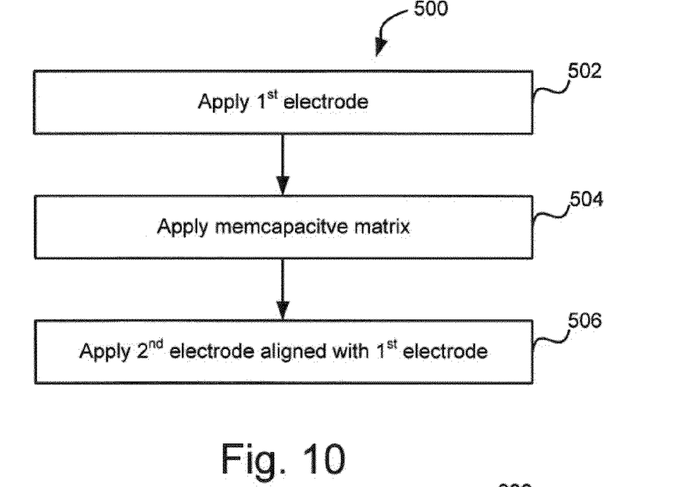
FIG. 10 is a flow diagram of a method of making a memcapacitive device in one embodiment.

FIG. 10 is a flow diagram of a method of making a memcapacitive device in one embodiment. A first electrode 104 is applied on a substrate 101. Various substrates 101 may be used including but not limited to: Si, Ge, glass, ceramics, etc. to just name a few. The first electrode 104 has a first end 105 and a second end 107 and is laid out in a pattern and shape to create an intrinsic inductance $L_i$. A memcapacitive matrix 102 with mobile dopants 111 is applied on the first electrode 104. A second electrode 106 is applied on the memcapacitive matrix 102. The second electrode 106 may have a first end 105 and a second end 107 aligned with the first end 105 and the second end 107 of the first electrode 104, respectively. A first signal 18 may be coupled to the first ends of the first and second electrodes 104, 106.

The electrodes 104, 106 may be constructed from a variety of conducting materials, including but not limited to: metals, metal alloys, metal composite materials, nano-structured metal materials, or other suitable conducting materials. The electrodes 104, 106 may be comprised of one or more layers. According to one exemplary embodiment, the electrodes 104, 106 have two layers: a first conducting layer which generally has low reactivity with the surrounding materials; and a metallic adhesion layer. The metallic adhesion layer can be, for example, aluminum or chromium.

Table 1 lists compatible primary materials, secondary materials, and dopant species for each memcapacitive combinations to make suitable memcapacitive matrix materials. The primary material is typically a highly insulating stoichiometric compound. The secondary material is the doped version of the primary material.

TABLE 1

List of Examples of Compatible Primary and Secondary Materials and Dopant Species

| Primary Material | Secondary Material | Dopant Species |
|---|---|---|
| Si | Lithium doped Si | Lithium |
| Si | Si:Ag | Silver (Ag) |
| $TiO_2$ | $TiO_{2-x}$ | Oxygen Vacancies |
| $ZrO_2$ | $ZrO_{2-x}$ | Oxygen Vacancies |
| $HfO_2$ | $HfO_{2-x}$ | Oxygen Vacancies |
| $SrTiO_3$ | $SrTiO_{3-x}$ | Oxygen Vacancies |
| GaN | $GaN_{1-x}$ | Nitrogen Vacancies |
| CuCl | $CuCl_{1-x}$ | Chlorine Vacancies |
| GaN | GaN:S | Sulfide Ions |

Table 1 lists only illustrative examples of possible matrix and dopant combinations and is not exhaustive. A variety of other matrix/dopant combinations could be used. For example, in addition to lithium, a number of other mobile dopant species could be used in a silicon matrix. Further, other matrix materials, such as germanium, could be used with appropriate dopant species to form a memcapacitive device.

The semiconducting regions 108, 112 within the memcapacitive matrix 102 may be made up of a variety of semiconductive material and is in many cases nano-crystalline or amorphous. There are many materials which could be used to make up the semiconducting regions 108, 112 including but not limited to silicon and germanium (see Table 1).

In one embodiment, the acceptor layer 110 within the memcapacitive matrix 102 may be made of a semiconductor material doped with acceptor atoms. The purpose of the acceptor layer 110 is to form a region within the memcapacitive matrix 102 in which the mobile dopant atoms 111 are more tightly and stably constrained. A typical semiconductor is made from elements in the group 14 section of the period table of elements which includes among others carbon, silicon, and germanium. The elements in this column each contain four valence electrons. When doping semiconductor material with acceptors, an element from the group 13 section of the periodic table of elements is used. This group includes among others, boron, aluminum, and gallium. Elements from this group contain three valence electrons. When elements from group 13 are bonded with elements from group 14, electron "holes" exist throughout the lattice.

As shown in FIGS. 3A-3B, the memcapacitive matrix 102 is divided into two regions. Because the semiconductor in the lightly doped regions 108, 120 is essentially non-doped, the electrical potential 118 is at the intrinsic level of the matrix. The negative charge of the acceptor layer 110 creates a negative potential well for positive charges. The positively charged mobile ions 111 tend to congregate in this well. As the density of the dopants rises, the density of free electrons also increases, making the acceptor layer 110 more conductive. In general, the relationship between electrical conductivity and electron density is given by the following equation:

$$\sigma = n * e * \mu$$

Where:
 $\sigma$=electrical conductivity of the material as a function of electron concentration.
 n=density of electrons
 e=electrical charge of an electron
 $\mu$=electron mobility An application of a programming voltage $V_{pgm}$ 24 or input signal 18 changes the state of the memcapacitive device 100 between a low capacitance state to a high capacitance state depending on polarity. In one exemplary embodiment, the programming voltage 24 applies a negative voltage to the bottom electrode 106. The bottom electrode 106 is closest to the acceptor layer 110 which contains mobile dopants 111. The programming voltage 24 may influence the redistribution of the mobile dopants 111 in several ways. First, the applied programming voltage 24 creates an electrical field which attracts the mobile dopants to the bottom electrode 106. Second, the programming voltage 24 may heat the memcapacitive matrix 102 which increases the diffusion rate of the mobile ions 111 within the memcapacitive matrix 102. This allows the mobile ions 111 to more quickly and easily be moved to the desired location within the memcapacitive matrix 102. According to one embodiment, a portion of the mobile ions 111 are pulled into the bottom semiconducting region 112 and significantly increase its electrical conductivity. After the application of the programming voltage 24, these mobile ions 111 will remain in the semiconducting region 112 during multiple operating cycles of the, input signal or until another programming voltage is applied.

The characteristics of the programming voltage determine how the mobile ions 111 are redistributed. For example, the polarity of the programming voltage 24 determines if the mobile dopants 111 move to the top or bottom through the memcapacitive matrix 102. The duration and intensity of the programming voltage 24 determine the distance and number of ions that are displaced within the matrix 102.

In the state illustrated in FIG. 3A, the lightly doped semiconductor region 108 between the top electrode 104 and the mobile ions 111 maintains its capacitance. However, the matrix region 112 has become conductive as a result of the motion of dopants 111 into this matrix region 112. Consequently, the capacitive behavior represented by the bottom capacitor $C_2$ 144 no longer exists.

The combination of materials and ions which make up the memcapacitive device is selected to achieve the desired mobility of the mobile dopant species and the stability of the acceptor ions. According to one exemplary embodiment, a silicon material matrix 102 could be used and the acceptor layer 110 may be doped with boron acceptor atoms. The boron acceptor atoms are negative charged ions and are relatively immobile within the silicon matrix 102. The mobile dopant species may be lithium ions, which have a positive charge and have mobility within the silicon matrix 102 which is orders of magnitude higher than the boron acceptor atoms. The lithium mobile dopants 111 are attracted to the negatively charged boron acceptor atoms within the acceptor layer 110.

Figure 11:
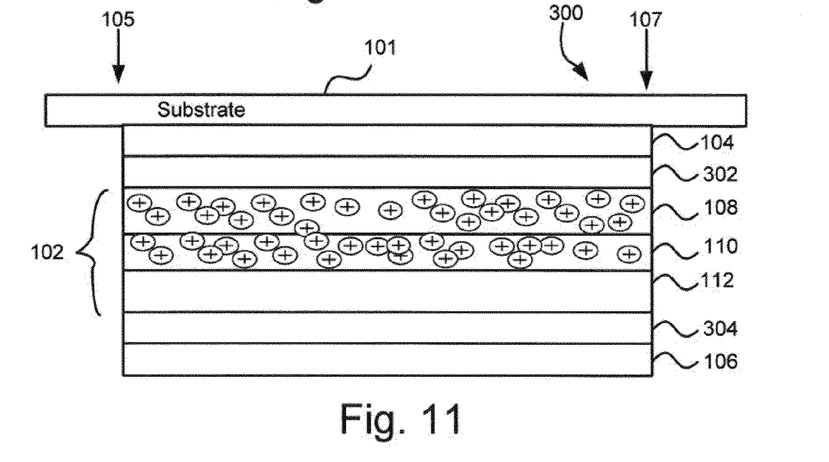
FIG. 11 is an illustration of an alternative embodiment of a memcapacitive device.

The memcapacitor configuration shown in FIGS. 3A-3B is only one exemplary embodiment of a memcapacitive device 100. A variety of other layers, electrode geometries, and other configurations could be used. FIG. 11 illustrates one alternative embodiment of a memcapacitor 300. In this embodiment, blocking layers 302, 304 are interposed between the electrodes 104, 106 and the memcapacitive matrix 102. These blocking layers 302, 304 may serve a number of functions including preventing the mobile dopant species 111 from interacting with the electrode material or otherwise escaping the memcapacitive matrix 102.

Additionally or alternatively, the memcapacitive matrix 102 may be a heterostructure in which the top region 108 is a different material than the acceptor and bottom regions 110, 112. For example, the top region 108 may be selected such that it is not permeable by the mobile dopant species 111. This may provide a number of advantages, including restricting mobile dopant motion to the acceptor and bottom regions 110, 112.

Figure 12:
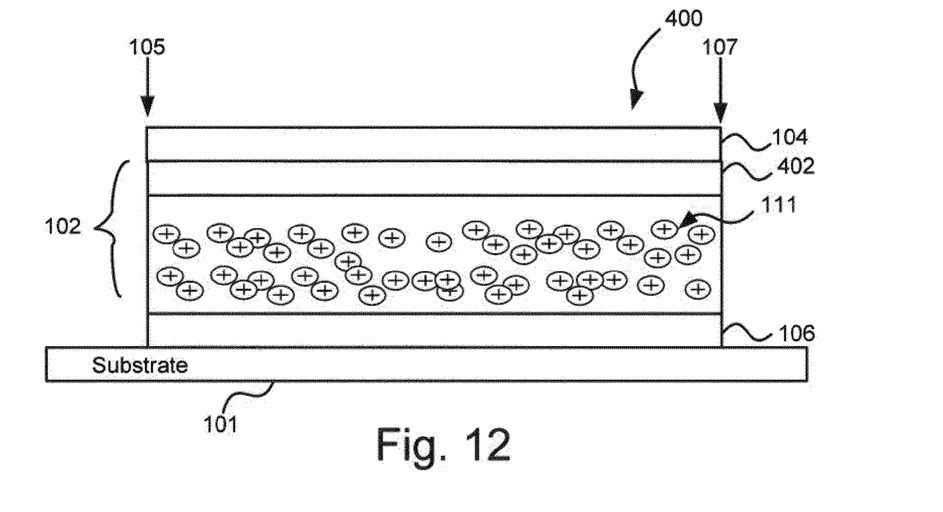
FIG. 12 is an illustration of an alternative embodiment of a memcapacitive device.

In some embodiments, the acceptor layer 110 may not be included in the memcapacitive device 100. FIG. 12 shows an embodiment of a memcapacitor 400 which has a dielectric blocking layer 402 interposed between the top electrode and a memcapacitive matrix 102. Mobile dopants 111 can be programmed with various distributions within the memcapacitive matrix 102 by the application of appropriate programming voltages across the two electrodes 104, 100. The memcapacitive device 400 can be programmed into a lower capacitance state by moving the mobile dopants 111 to contact the bottom electrode 106 as illustrated in FIG. 12. To increase the capacitance of the memcapacitive device 400, the mobile dopants 111 can be moved away from the bottom and out of electrical contact with the bottom electrode 106.

Figure 13:
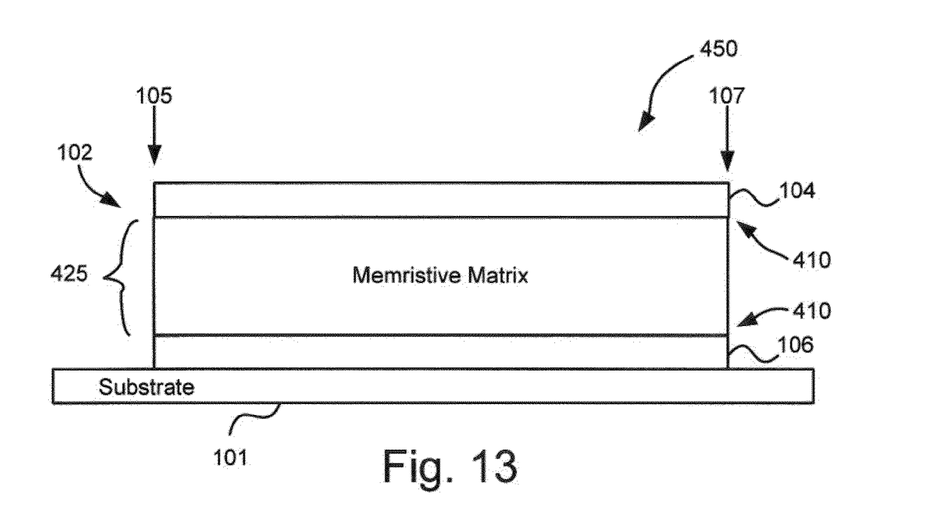
FIG. 13 is an illustration of an alternative embodiment to a memcapacitive device.

FIG. 13 is an alternative embodiment of memcapacitive device 100 as a memristive-based device 450. In this embodiment, the Schottky-like diode interface such as in FIG. 3B is made between at least one electrode 104, 106 and the memristive matrix 405. The memristive matrix 405 can be programmed to affect the capacitance of the Schottky-like diode interface which is reversed biased. The Schottky-like diode interface's capacitance operates in a non-linear fashion. While this embodiment does require continual DC bias to place the Schottky-like diode interface into reverse bias, it benefits from a possibly simplified structure while providing for distributive LC delay as in the other embodiments.

For instance, this device 450 includes a first electrode 104 having a first end 105 and a second end 107 and a second electrode 106. A memcapacitive matrix 102 made of a memristive matrix 405 and a reversed biased Schottky-like diode interface 410 between the memristive matrix 405 and one of the first and second electrodes 104, 106 is interposed between the first electrode 104 and the second electrode 106. By proper biasing of the Schottky-like interface 410, the memcapacitive matrix 102 has a non-linear capacitance with respect to a voltage across the first electrode 104 and the second electrode 106. Further, the memcapacitive matrix 102 is configured by programming the memristive matrix 405 to alter a signal on the first end 105 at the second end 107 by at least one of a) changing at least one of a rise-time and a fall-time of the signal and b) delaying the transmission of the signal based on the application of a programming voltage across the first electrode 104 and the second electrode 106.

While the present invention has been particularly shown and described with reference to the foregoing preferred and alternative embodiments, those skilled in the art will understand that many variations may be made therein without departing from the spirit and scope of the invention as defined in the following claims. This description of the invention should be understood to include all novel and non-obvious combinations of elements described herein, and claims may be presented in this or a later application to any novel and non-obvious combination of these elements. The foregoing embodiments are illustrative, and no single feature or element is essential to all possible combinations that may be claimed in this or a later application. Where the claims recite "a" or "a first" element of the equivalent thereof, such claims should be understood to include incorporation of one or more such elements, neither requiring nor excluding two or more such elements.

What is claimed is:

1. A memcapacitive device, comprising:
a first electrode having a first end and a second end;
a second electrode;
a menicapacitive matrix with mobile dopants interposed between the first electrode and the second electrode wherein the memcapacitive matrix has a nonlinear capacitance with respect to a voltage across the first electrode and the second electrode and wherein the memcapacitive matrix is configured to alter a first signal on the first end at the second end to create a second signal by at least one of a) changing at least one of a rise-time and a fall-time of the first signal on the second signal and b) delaying the transmission of the first signal to the second signal based on the application of a programming voltage across the first electrode and the second electrode to move the mobile dopants.

2. The device line of claim 1, wherein the memcapacitive matrix includes a first blocking layer interposed between one of the first and second electrodes and the memcapacitive matrix wherein the first blocking layer is configured to prevent the mobile dopants from escaping the memcapaeitive matrix.

3. The device of claim 2, wherein the first blocking layer is a dielectric material.

4. The device of claim 2, wherein the mobile dopants have a high diffusion constant.

5. The device of claim 2, wherein the mobile dopants have a low diffusion constant.

6. The device of claim 1, further comprising a. programming circuit coupled to the first electrode and the second electrode and configured to adjust the capacitance between the first electrode and the second electrode.

7. The device of claim 1, further comprising a timing detect circuit coupled to the first and the second end of the first electrode and the second electrode and configured to detect a predetermined delay between the first signal present at the first end and the second signal present at the second end.

8. The device of claim 1, wherein the memcapacitive matrix is electrically configured between a higher capacitance and a lower capacitance to shape at least one of a leading edge and a trailing edge of the first signal present at the first end to create the second signal present at the second end.

9. The device of claim 1, wherein the memcapacitive matrix is electrically configured between a higher capacitance and a lower capacitance to allow its capacitance to be adjusted based on an amount of time the first signal is present on the first end such that at least one of a leading edge and trailing edge of the second signal is respectively delayed in relation to said amount of time.

10. The device of claim 1, wherein the memcapacitive matrix is electrically configured between a higher capacitance and a lower capacitance to allow its capacitance to be adjusted by a second voltage such that at least one of a leading edge and a trailing edge of the first signal present at the first end is delayed in relation to the second voltage in the second signal present at the second end.

11. A method of using a memcapacitive device having a first electrode with a first end and a second end and a second electrode to delay a first signal, comprising:

applying the first signal to the first end of the first electrode and the second electrode;

applying a programming voltage to the first electrode and the second electrode;

sensing a second signal at the second end of the first electrode; and adjusting the programming voltage to alter a capacitance of a memcapacitive matrix interposed between the first and second electrodes until a desired delay between the first signal and the second signal is present.

12. A method of using a memcapacitive device having a first electrode with a first end and a second end and a second electrode to detect an amount of time a first signal is present, comprising:

applying the first signal to the first end of the first electrode sufficient to alter the capacitance of a memcapacitive matrix with mobile &pants interposed between the first electrode and the second electrode; and sensing the delay between the first signal and a second signal at the second end of the first electrode.

13. A method of using a memcapacitive device having a first electrode with a first end and a second end and a second electrode to shape at least one of a leading edge and a trailing edge of a first signal present at the first end to a second signal present at the second end, comprising:

programming a capacitance of a memcapacitive matrix with mobile dopants in the memcapacitive device to a non-linear capacitive state;

applying the first signal to the first end of the first electrode sufficient for moving the mobile dopants to alter the capacitance of the memcapacitive matrix during a transition time of the leading edge and trailing edge.

14. The method of claim 13 wherein the mobile dopants have a high diffusion constant.

15. A method of making a memcapacitive device to alter a first signal, comprising:

providing a first electrode having a first end and a second end on a substrate having a pattern and shape defining a desired intrinsic inductance L;

providing a memcapacitive matrix having mobile dopants on the first electrode; with providing a second electrode on the inemcapacitive matrix, the second electrode having a first end and a second end aligned with the first end and the second end of the first electrode, respectively; and wherein applying the first signal to the first end of the first electrode sufficient for moving the mobile dopants to alter the capacitance of the memcapacitive matrix during transition time of the first signal.

* * * * *

UNITED STATES PATENT AND TRADEMARK OFFICE
CERTIFICATE OF CORRECTION

| | | |
|---|---|---|
| PATENT NO. | : 8,493,138 B2 | Page 1 of 1 |
| APPLICATION NO. | : 12/548124 | |
| DATED | : July 23, 2013 | |
| INVENTOR(S) | : John Paul Strachan et al. | |

It is certified that error appears in the above-identified patent and that said Letters Patent is hereby corrected as shown below:

In the Claims

In column 16, line 65, in Claim 1, delete "menicapacitive" and insert -- memcapacitive --, therefor.

In column 17, line 11, in Claim 2, delete "device line" and insert -- device --, therefor.

In column 17, line 15, in Claim 2, delete "memcapaeitive" and insert -- memcapacitive --, therefor.

In column 17, line 23, in Claim 6, delete "a." and insert -- a --, therefor.

In column 18, line 18, in Claim 12, delete "&pants" and insert -- dopants --, therefor.

In column 18, line 44, in Claim 15, delete "electrode; with" and insert -- electrode; --, therefor.

In column 18, line 45, in Claim 15, delete "inemcapacitive" and insert -- memcapacitive --, therefor.

Signed and Sealed this
Thirty-first Day of December, 2013

Margaret A. Focarino
*Commissioner for Patents of the United States Patent and Trademark Office*